United States Patent
Eriksson

(10) Patent No.: US 10,428,984 B2
(45) Date of Patent: Oct. 1, 2019

(54) METHOD FOR FORMING FASTENING COLLAR

(71) Applicant: GS-HYDRO OY, Hameenlinna (FI)

(72) Inventor: Risto Eriksson, Hameenlinna (FI)

(73) Assignee: GS-HYDRO OY, Hämeenlinna (FI)

( * ) Notice: Subject to any disclaimer, the term of this patent is extended or adjusted under 35 U.S.C. 154(b) by 502 days.

(21) Appl. No.: 15/027,590

(22) PCT Filed: Oct. 7, 2014

(86) PCT No.: PCT/FI2014/050762
§ 371 (c)(1),
(2) Date: Apr. 6, 2016

(87) PCT Pub. No.: WO2015/052377
PCT Pub. Date: Apr. 16, 2015

(65) Prior Publication Data
US 2016/0245437 A1    Aug. 25, 2016

(30) Foreign Application Priority Data
Oct. 8, 2013 (FI) ...................................... 20136004

(51) Int. Cl.
*F16L 23/028* (2006.01)
*B21D 22/14* (2006.01)
(Continued)

(52) U.S. Cl.
CPC ........ *F16L 23/0283* (2013.01); *B21D 19/046* (2013.01); *B21D 22/14* (2013.01); *B21D 41/02* (2013.01); *Y10T 29/49* (2015.01)

(58) Field of Classification Search
CPC .. F16L 23/0283; F16L 23/028; B21D 19/046; B21D 19/04; B21D 19/00; B21D 41/02;
(Continued)

(56) References Cited

U.S. PATENT DOCUMENTS 1,032,718 A * 7/1912 White ..................... B21C 37/08
228/144
1,696,229 A * 12/1928 Fantz ..................... B21D 19/02
29/DIG. 43
(Continued)

FOREIGN PATENT DOCUMENTS

CN        85104658 A    12/1986
DE        26 14 477 A1  10/1977
(Continued)

OTHER PUBLICATIONS

English Machine Translation of JP2001205367A, Okamura et al., Jul. 31, 2001.*
(Continued)

*Primary Examiner* — Sarang Afzali
(74) *Attorney, Agent, or Firm* — Sughrue Mion, PLLC

(57) ABSTRACT

The invention relates to a method for forming a fastening collar. A fastening collar is formed to the end of the tubular piece by shaping the end of the tubular piece in a first step by means of a first rotatable shaping head and a counter-surface to a first angle, and in a second step by means of a second rotatable shaping head and a counter-surface to a second angle. The outermost end of a flange part shaped in the first step is shaped in the second step in such a manner that only part of the flange part formed in the first step is shaped into a support surface that is perpendicular to the longitudinal axis of the tubular piece.

4 Claims, 5 Drawing Sheets

(51) Int. Cl.
*B21D 41/02* (2006.01)
*B21D 19/04* (2006.01)

(58) Field of Classification Search
CPC ...... B21D 41/023; B21D 41/00; B21D 22/14; Y10T 29/49
USPC .......... 285/334.1, 334.2, 334.4, 368; 72/117, 72/370.11
See application file for complete search history.

(56) References Cited

U.S. PATENT DOCUMENTS

| | | | | |
|---|---|---|---|---|
| 3,451,243 | A | * | 6/1969 | Gallinger ............ B21D 19/046 72/124 |
| 3,628,815 | A | | 12/1971 | King |
| 4,905,492 | A | * | 3/1990 | Lobakk ............... B21D 19/046 72/117 |
| 7,418,850 | B2 | * | 9/2008 | Kondo .................. F16L 23/00 72/117 |
| 8,312,753 | B2 | * | 11/2012 | Futagi ............... B21D 51/2615 413/73 |
| 2013/0133390 | A1 | | 5/2013 | Leppañen |

FOREIGN PATENT DOCUMENTS

| | | |
|---|---|---|
| FI | 89137 B | 5/1993 |
| FI | 122833 B | 7/2012 |
| GB | 191503604 A | 3/1916 |
| JP | 5-322079 A | 12/1993 |
| JP | 2001-205367 A | 7/2001 |
| JP | 2010-179365 A | 8/2010 |
| JP | 4551462 B2 | 9/2010 |

OTHER PUBLICATIONS

Communication dated May 11, 2017 from the European Patent Office in counterpart Application No. 14852853.2.
Communication dated Dec. 22, 2016, from the State Intellectual Property Office of People's Republic of China in counterpart Application No. 201480063467.9.
International Search Report for PCT/FI2014/050762 dated Dec. 15, 2014.
Written Opinion for PCT/FI2014/050762 dated Dec. 15, 2014.
Finnish Search Report for FI 20136004 dated May 21, 2014.

* cited by examiner

METHOD FOR FORMING FASTENING COLLAR

CROSS REFERENCE TO RELATED APPLICATIONS

This application is a National Stage of International Application No. PCT/FI2014/050762 filed Oct. 7, 2014, claiming priority based on Finnish Patent Application No. 20136004 filed Oct. 8, 2013, the contents of all of which are incorporated herein by reference in their entirety.

TECHNICAL FIELD

The invention relates to a method for forming a fastening collar that is essentially perpendicular to the longitudinal direction of a tubular piece to the end of the tubular piece, the method comprising forming the fastening collar to the end of the tubular piece by shaping the end of the tubular piece in a first step by means of a first rotatable shaping head and a countersurface to a first angle, and in a second step by means of a second rotatable shaping head and a countersurface to a second angle.

The invention further relates to a flange joint that is formed by using fastening collars formed with the method of the invention.

The invention relates to the end-to-end joints of pipes, such as metal pipes, in other words, to joints with which the ends of parallel pipes are joined. Joints of this type are very common in various fields of technology and they have been generally used at least from the 1800s.

BACKGROUND ART

End-to-end joints of pipes made of metal material may be implemented in many different ways. One example of previously known solutions is a joint structure, in which a fastening collar is formed to a pipe end in a device with a rotating shaping cone, for instance. The fastening collar is formed in such a manner that the collar is at a substantially 37-degree angle to the longitudinal axis of the pipe. An inner piece is connected to the flange formed in the above-mentioned manner to provide sealing. The structure also has a tightening flange and tightening elements, with which the structure is tightened against a second corresponding structure. Such a structure is described in FI patent publication 70080.

A drawback of the structure described above is the high cost of manufacture. The high cost is caused, in particular, by the manufacture of the inner piece that requires precision work and increases costs substantially. The drawback is especially emphasized in connection with large-diameter pipes.

Another example of solutions known in the field is a solution, in which the fastening collar is formed in two steps. In the first step, the fastening collar is shaped to be at a substantially 37-degree angle to the longitudinal axis of the pipe. In the second step, the fastening collar is shaped to be at a 90-degree angle to the longitudinal axis of the pipe. This type of solution is shown in FI Patent 89137.

A drawback in the structure described above is the shaping of the fastening collar to the 90-degree angle, which is a difficult step in terms of the pipe material, since material elongation, or degree of deformation, at the bend is relatively large in this type of shaping.

BRIEF SUMMARY OF THE INVENTION

The object of the invention is to provide a method for forming a fastening collar, and a flange joint that allow the prior-art disadvantages to be eliminated. This is achieved by the invention.

The method of the invention is characterised in that the outermost end of the flange part of the tubular piece shaped in the first step is shaped in the second step in such a manner that only part of the flange part formed in the first step is shaped into a support surface that is essentially perpendicular to the longitudinal axis of the tubular piece.

Above all, the invention provides the advantage that the relatively large degree of deformation in the prior art is eliminated. Another advantage is that the practical implementation of the solution according to the invention is inexpensive and easily applied to different joints, such as low-pressure and high-pressure joints. In connection with the invention, there is no need for an inner piece designed for every pipe size.

BRIEF DESCRIPTION OF THE DRAWINGS

The invention will now be described in more detail by means of an embodiment shown in the attached drawing, in which.

DETAILED DESCRIPTION OF PREFERRED EMBODIMENTS

Figure 1:
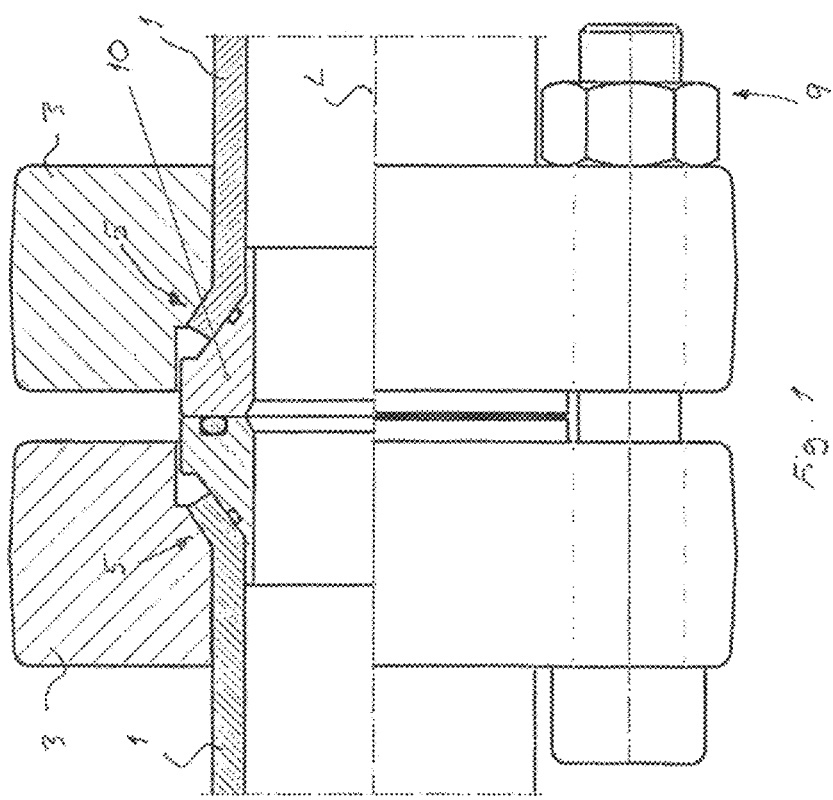
FIG. 1 is a schematic view of a flange joint formed by means of fastening collars according to a prior-art embodiment.

FIG. 1 is a schematic view of a flange joint that uses fastening collars made with a method according to a prior-art embodiment. The tubular pieces are marked with reference number 1. The tightening flanges used in the joint are marked with reference number 3 and the tightening elements with reference number 9. The inner piece used in the joint is marked with reference number 10. The inner piece may be equipped with different seals in accordance with the need and situation at each time. The fastening collars are generally marked with reference number 5. FIG. 1 shows schematically two different inner pieces. The inner pieces used in both tubular pieces may naturally be alike, if the structure as whole allows the use of similar inner pieces.

The drawbacks of the solution according to FIG. 1 relate to the inner piece 2, because each pipe size needs to have several different inner pieces in accordance with the sealing type. This generates costs, extended delivery times, and high storage costs.

The joint according to FIG. 1 represents the general state of the art to a person skilled in the art, so said structure is not described in more detail herein. Herein, reference is only made in general to FI patent publication 70080 that describes the art in more detail.

Figure 2:
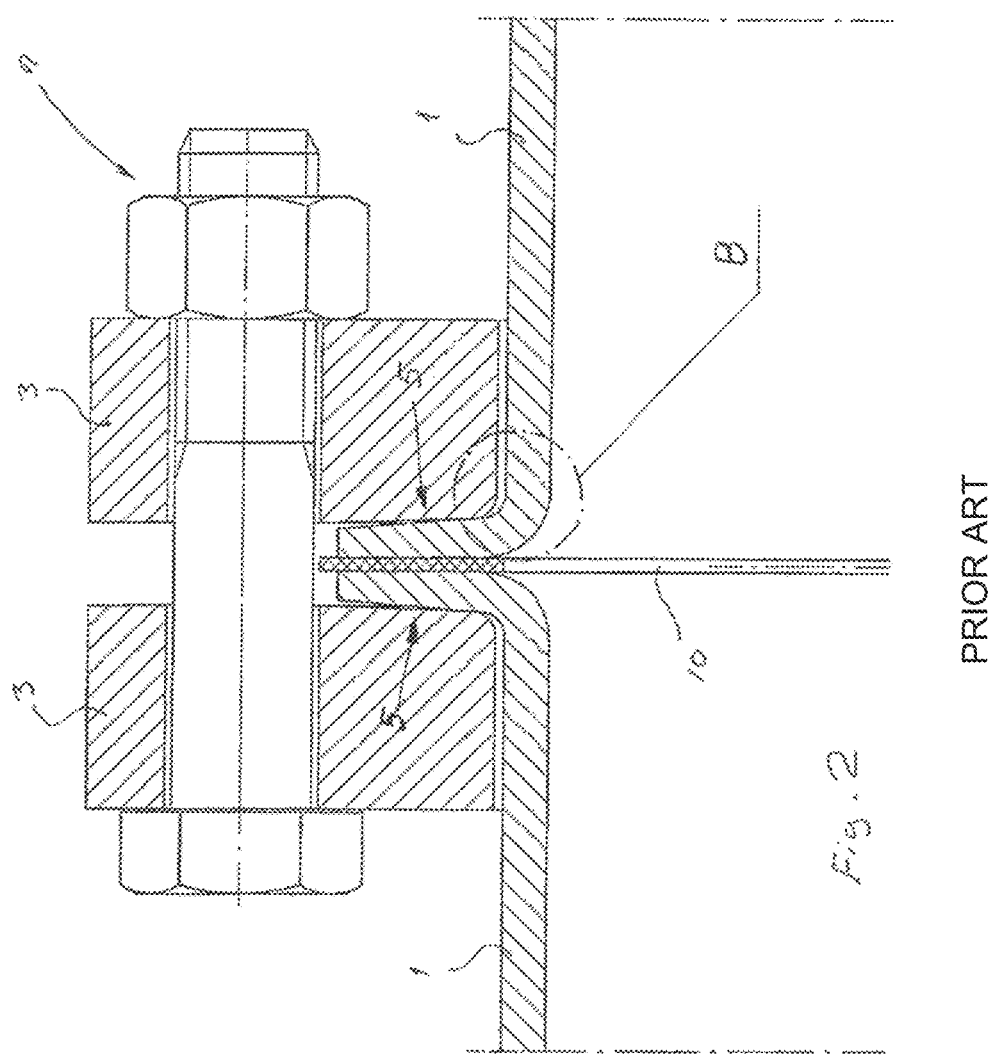
FIG. 2 is a schematic view of a flange joint formed by means of fastening collars according to a second prior-art embodiment.

FIG. 2 is a schematic view of a flange joint that uses fastening collars made with a method according to a second prior-art embodiment. The tubular pieces are marked with reference number 1 as in FIG. 1. The tightening flanges used in the joint are marked with reference number 3 and the tightening elements with reference number 9 as in FIG. 1. The sealing element is marked by reference number 10. The fastening collars are generally marked with reference number 5. The joint type shown in FIG. 2 is generally only used in low-pressure joints.

The joint according to FIG. 2 represents the general state of the art to a person skilled in the art. The fastening collars used in the joint of FIG. 2 are formed in accordance with the prior art, in the manner shown in FI patent publication 89137, for example.

A problem with the solution of FIG. 2 is the degree of deformation produced in forming the fastening collars in location B of FIG. 1, which is relatively large, as stated earlier.

Figure 3:
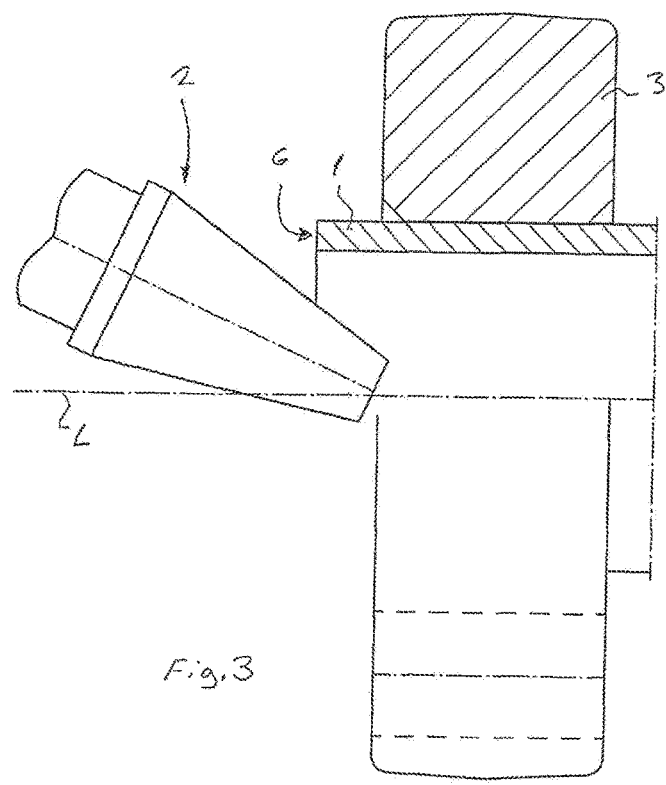
FIGS. 3 and 4 are schematic views of a first shaping step in the method according to the invention.
Figure 4:
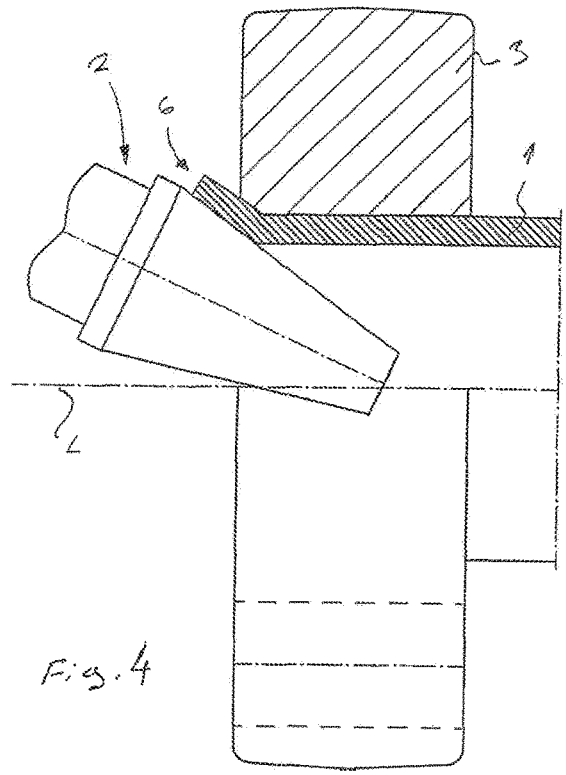

FIGS. 3 and 4 are schematic views of a first step in the method according to the invention. The same reference numbers are used in FIGS. 3 and 4 as in FIGS. 1 and 2 to refer to the corresponding parts. FIG. 3 shows the initial situation in the first step, wherein a fastening collar is formed at the end of the tubular piece 1. The face of the tubular piece, in other words, the edge surface of the wall of the tubular piece, which is perpendicular to the longitudinal axis of the tubular piece, is marked with reference number 6.

In the situation of FIG. 3, the tubular piece 1 is supported firmly in place and the first rotatable shaping head 2 is brought into contact with the end of the tubular piece. The end of the pipe can be supported in place in any suitable manner. In the example of FIG. 1, the support is implemented by means of the tightening flange 3 used in the joint, in which case the formed fastening collar can be made to correspond to the shape of the tightening flange. It is clear that fastening jaws or some other suitable means that have been correspondingly designed can also be used in the support.

The device, with which the end of the tubular piece is shaped, is fully known to a person skilled in the art, so the device or its operation is not described in more detail herein. In this context, reference is made to FI patent publication 89137, in which an embodiment of such a device is described in general.

FIG. 4 shows in general the end stage of the first shaping step of the method according to the invention, in other words, the actual shaping step, in which the end of the tubular piece 1 is shaped by means of the first rotatable shaping head 2 to be at a first angle. The size of the angle is not important as such, the essential thing is that at this stage an acute angle that suitably differs from 0 degrees is achieved. An example of a suitable angle formed in the first shaping step of the method is a substantially 37-degree angle. The above-mentioned angle refers herein to an angle in relation to the longitudinal axis L of the tubular piece 1. This way, a protruding collar is achieved at the end of the pipe, which is then in the second step shaped into a fastening collar 5 shown in FIG. 4. In the situation of FIG. 3, the face 6 of the tubular piece 1 turns outward to an angular position in relation to the longitudinal axis L of the tubular piece as the end is formed. The turned face 6 is shown in FIG. 3. The angle, to which the face 6 turns, depends on the angle, to which the end of the tubular piece 1 is shaped.

Figure 5:
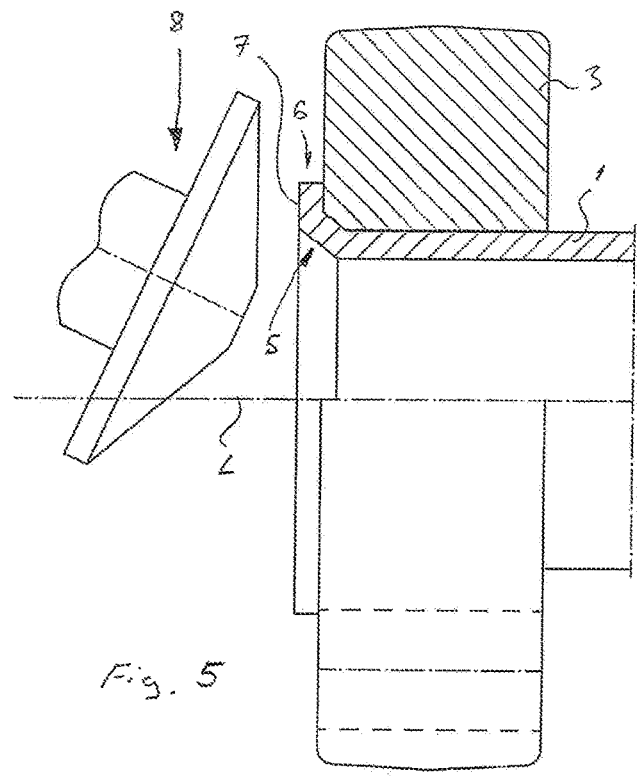
FIG. 5 is a schematic view of a second shaping step in the method according to the invention.

FIG. 5 is a schematic view of a second shaping step in the method according to the invention. In the second shaping step, the end of the tubular piece 1, which in the first step was shaped into a substantially 37-degree angle, for example, to the longitudinal axis L of the tubular piece, is shaped in such a manner that a portion of the flange part at a substantially 37-degree angle, for instance, produced in step 1 is formed into a support surface 7. The support surface 7 forms a sealing for the joint with a sealing element 10, as shown in FIG. 5, for example.

The support surface 7 is essentially perpendicular to the longitudinal axis L of the tubular piece 1, as shown in FIG. 5. In the second shaping step, a second rotatable shaping head 8 is used, its shaping surface being at a substantially 90-degree angle to the longitudinal axis L of the tubular piece 1.

Different separate shaping heads can be used as the rotatable shaping heads 2, 8. However, this is not the only option, and the method steps described above may also be implemented by the same rotatable shaping head that is arranged in different positions to move the shaping surfaces of the shaping head in the positions shown in FIGS. 4 and 5, for instance. It is also possible to use an auxiliary structure arranged on top of one shaping head to provide the shaping heads described above, etc.

Figure 6:
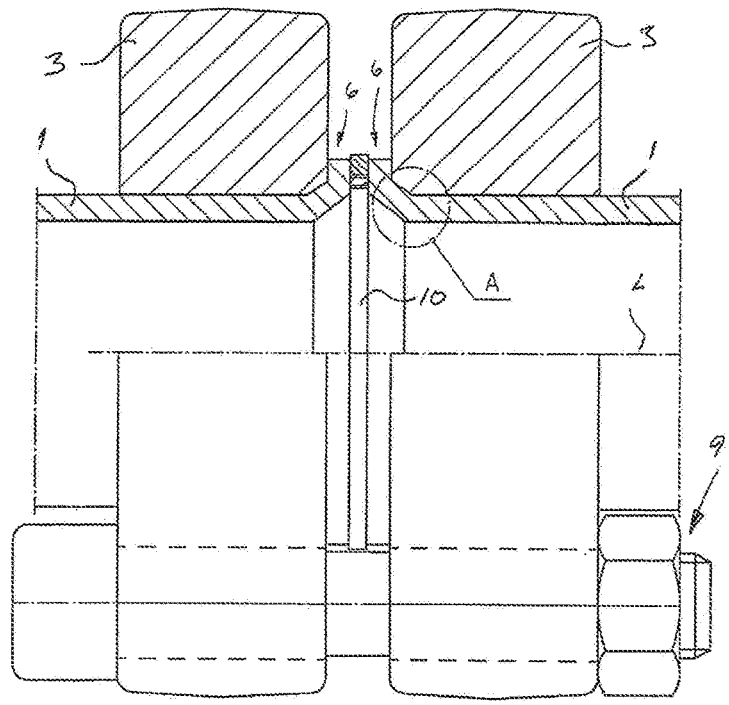
FIG. 6 is a schematic view of a flange joint formed by using fastening collars made with the method of the invention.

When comparing FIG. 2 and FIGS. 5 and 6 with each other, it can be seen that the degree of deformation in the material of the tubular piece 1 is large at location B of FIG. 2 and considerably smaller at location A (FIG. 6). In the invention, the wall of the tubular piece 1 is not shaped into a 90-degree angle at one point as is done in the prior art, but the wall of the tubular piece is shaped along a longer area to provide a support surface 7 that is at a substantially 90-degree angle to the longitudinal axis L of the tubular piece. This is done by shaping in the second step only a portion of the collar produced in the first step, in other words, only the area at the outermost end of the flange part of the tubular piece formed in the first step is shaped, as shown in the figures.

FIG. 6 is a general view of a flange joint formed by applying the method of the invention. The same reference numbers are used in FIG. 6 as in FIGS. 1 to 5 to refer to the corresponding parts.

In the example of FIG. 6, there are two tubular pieces 1, the ends of which have fastening collars 5 formed in the manner of FIGS. 3 to 5. The tubular pieces 1 are in the situation of FIG. 5 arranged end to end so that their longitudinal axes L are on the same line. The ends of the tubular pieces 1 are tightened against each other by means of tightening flanges 3 and tightening elements 9. The tightening elements 9 may be formed of combinations of bolts and nuts, for example, that are arranged at regular intervals in holes on the surfaces of the tightening flanges.

FIG. 6 further shows that support surfaces 7 formed on the edge of the fastening collar form together with a sealing element 10 the sealing of the joint, when the tightening elements 9 are tightened to press the tubular pieces 1 against each other. The control of the sealing element 10, in other words, its centring in place, can be done by means of the tightening elements 9 of the joint, for example. Alternatively, the centring of the tightening element 10 can be done using either the fastening collar of the second tubular piece or those of both tubular pieces, etc.

Figure 7:
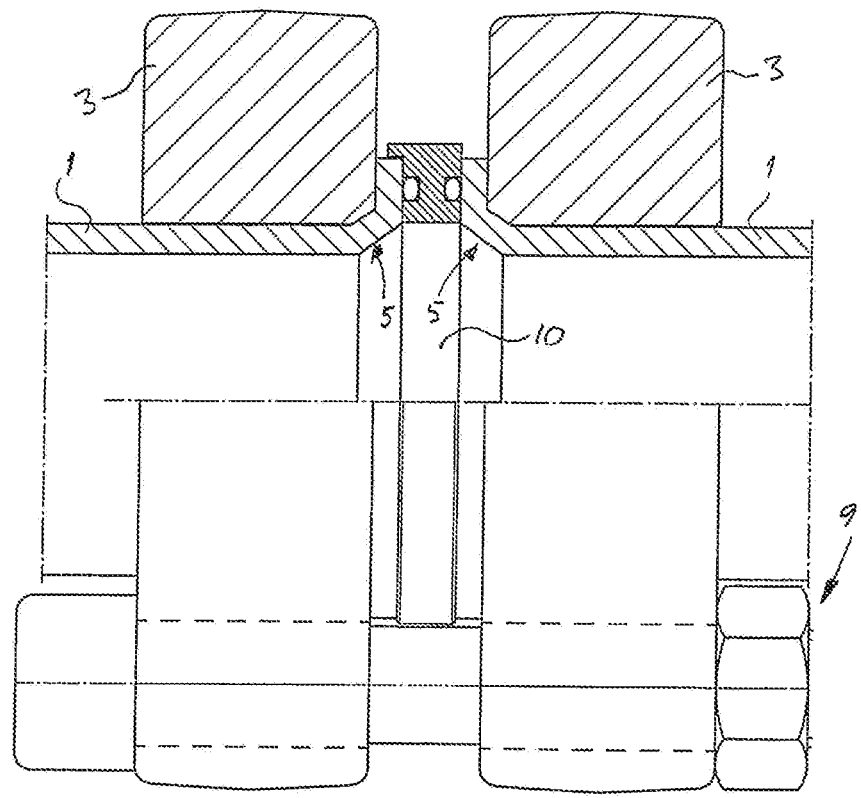
FIG. 7 is a schematic view of a second flange embodiment that uses fastening collars made with the method according to the invention.

FIG. 7 shows in general a second flange joint embodiment. The same reference numbers are used in FIG. 7 as in FIGS. 1 to 6 to refer to the corresponding parts. The joint of FIG. 7 differs from that of FIG. 6 in the structure of the sealing element 10, among other things.

The invention is described above by means of embodiments shown in the figures. However, the invention is not in any way restricted to the above-mentioned examples, but may be freely modified within the scope of the claims. The material of the tubular pieces is not in any way restricted to one specific material, but different materials can be used. Examples of suitable materials include steel materials, such as St 37, and stainless austenitic steel, such as AISI 316. Essential to the material is that the material of the tubular pieces is suited for cold forming.

The invention claimed is:

1. A method for forming a fastening collar that is perpendicular to a longitudinal axis of a tubular piece to an end of the tubular piece, the method comprising:
    forming the fastening collar to the end of the tubular piece by shaping the end of the tubular piece in a first step by a first rotatable shaping head and a counter-surface to a first angle, and in a second step by a second rotatable shaping head and a counter-surface to a second angle, wherein an outermost end of a flange part of the tubular piece shaped in the first step is shaped in the second step in such a manner that only a section of the flange part formed in the first step is shaped into a support surface, which is perpendicular to the longitudinal axis of the tubular piece, and a surface of a tightening flange used in forming a joint between the tubular piece and a second corresponding tubular piece, is used as a stop face in the first and second shaping steps.

2. The method as claimed in claim 1 wherein the end of the tubular piece is shaped in the first step to be at a substantially 37-degree angle to the longitudinal axis of the tubular piece.

3. The method as claimed in claim 1, wherein the flange part of the tubular piece formed in the first step is shaped in the second step with the second rotatable shaping head, the shaping surface of which is at a 90-degree angle to the longitudinal axis of the tubular pieces.

4. The method as claimed in claim 1, wherein different shaping heads are used as the first and second rotatable shaping heads.

* * * * *